Patented Sept. 1, 1936

2,053,233

UNITED STATES PATENT OFFICE 2,053,233

CATALYST AND CATALYTIC PROCESS

John C. Woodhouse, Wilmington, Del., assignor to E. I. du Pont de Nemours & Company, Wilmington, Del., a corporation of Delaware No Drawing. Application June 24, 1933,
Serial No. 677,460

8 Claims. (Cl. 260—116)

This invention relates to catalysts for use in various catalytic processes, such, for example, as those in which carbon monoxide is one of the reacting substances; and comprises essentially as a catalyst for such reactions active carbon containing an adsorbed material.

It is known that many compounds which have slight, if any, catalytic activity for a particular reaction can be made into a highly active catalyst therefor by the use of a suitable promoter. Thus, nickel, which is but a mediocre catalyst under the usual operating conditions for the preparation of hydrogen by the interaction of methane and steam, can be made highly active therefor by promoting it with alumina. Many organic reactions, however, are not operable upon a commercial scale even with promoted catalysts, and others in commercial use are being constantly investigated to improve the catalyst. Particularly is this true of the following reactions when conducted in the vapor phase:

(1) $CO+ROH \rightarrow RCOOH$ and/or $HCOOR$
(2) $CO+C_nH_{2n}+H_2O \rightarrow$ aliphatic acids
(3) $CO+RH+Cl_2 \rightarrow RCOCl+HCl$
(4) $CO+R_2O \rightarrow RCOOR$
(5) $CO+RCl \rightarrow RCOCl$
(6) $CO+H_2 \rightarrow HCHO$ and/or $CH_3OH$
(7) $CO+RH \rightarrow RCHO$
(8) $C_nH_{2n}+CO_2 \rightarrow C_nH_{2n-1}COOH$
(9) $Cl_2+ROH+H_2O \rightarrow$ chlor acids (among other products)
(10) $C_nH_{2n-2}+CO_2 \rightarrow C_nH_{2n-3}COOH$
(11) Dimerization and antioxidation of beta arylacrylic acids.
(12) $ClROR+CO \rightarrow RORCOCl$
(13) $ClROR+C_nH_{2n} \rightarrow ClC_nH_{2n}ROR$ In the above reactions R indicates hydrogen, alkyl, aryl, or aralkyl grouping. Thus, in reaction (1), by substituting the alkyl, $CH_3$, for R, methanol is indicated as reacting with the CO to form acetic acid or methyl formate. In reaction (7) by substituting aryl, $C_6H_5$, for R,—benzene is indicated as reacting with CO to form benzaldehyde. In reaction (2) if ethylene were the olefinic hydrocarbon used, propionic acid would be the acid obtained, in (8) with ethylene, as the olefine, acrylic acid is obtained, in (10) with acetylene, tetrolic acid is the product, and in (11) trans-cinnamic acid yields alpha truxillic acid and benzaldehyde. In the condensation reaction (12) if R indicates methyl, monochlormethyl ether is converted to methoxy acetyl chloride, and in (13) by a similar substitution and with ethylene as the olefine, gammachlormethyl ether is obtained.

By the substitution of other appropriate compounds in these reactions, it will be appreciated by those skilled in the art that many important products are indicated.

An object of the present invention is to provide a new type of catalyst. Another object of the invention is to provide a two component catalyst, for vapor phase reactions, which functions in several phases,—the one component in the liquid and/or vapor phase, and the other in the solid phase. A further object of the invention is to provide a process for accelerating reactions in which carbon monoxide is one of the reacting constituents. A still further object of the invention is to provide a catalyst comprising active carbon containing an adsorbed material. Other objects and advantages will hereinafter appear.

I have found that various organic reactions, such as those described above, as examples, can be accelerated by conducting the reacting constituents over activated charcoal which contains an adsorbed hydrogen and/or ammonium halide. This catalyst is surprisingly more active than charcoal or a halide used alone for the same purpose, and in many reactions when used separately there is no appreciable activity but when combined, in accord with my invention, excellent activity is obtained. This catalyst can be prepared in many different manners. For example, activated charcoal may be saturated with a strong aqueous ammonium halide solution, and in this condition, is placed in a reaction chamber for the preparation of propionic acid from ethylene, CO, and water. An initial high yield of propionic acid will be obtained under the usual conditions of operating such reactions, e. g. at from 200–400° C. and 25–900 atmospheres or higher, and by injecting into the reactants an aqueous solution of the ammonium halide, substantially the initial high activity of the catalyst can be maintained over an indefinite period. The catalyst may be employed in reactions designated above under (1) by injecting into the carbon monoxide and the alcohol a hydrogen halide or an ammonium halide and passing the resulting gaseous mixture over active carbon. Other gaseous reactions may be catalyzed in a reaction chamber wherein active carbon or activated charcoal is maintained in an atmosphere of a volatile halide.

I have found that not only the volatile halides themselves, but also compounds which form them or decompose under the conditions existing during the reaction to produce them, may be used. The volatile halides or compounds that form them, which I have found suitable for use in conjunction with the active carbon, include: hydrogen chloride, hydrogen bromide, hydrogen iodide; the chlorides, bromides, and iodides of ammonia; the halogen amines, such as chloramine, etc.; and the alkyl halides—ethyl chloride, methyl bromide, etc.

Whether the halide is adsorbed in the carbon, or the carbon in an atmosphere of the volatile halide, is responsible for the activity of this catalyst is not definitely known. The high adsorbing characteristics of the active carbon and its ability, theoretical at least, to orient organic compounds upon its surface, in which condition they are, apparently, readily acted upon by the halide constituent of my catalyst, is believed, however, to be in no small measure responsible for its activity. There is, on the other hand, a possibility that the excellent activity of this two component catalyst is due to the halide coexisting as an atmosphere above, as well as being adsorbed upon the carbon. This theoretical consideration will in no way limit the scope of the invention and is given in order that a fuller concept of the apparent operation of this type of catalyst may be realized by those skilled in this art.

Although my invention is susceptible of variation as to details of procedure employed, the following examples will illustrate several of the large number of reactions in which my catalyst may be employed.

Example 1.—A gaseous mixture was prepared containing by volume 95% carbon monoxide, and 5% ethylene, together with steam, to give a steam: carbon monoxide ratio of approximately 0.25, the steam being derived from the injection of an appropriate amount of a 1% aqueous solution of ammonium chloride to give this steam: gas ratio. The resulting gaseous mixture was passed into a conversion chamber designed for carrying out exothermic gaseous reactions and in which activated charcoal was disposed. The temperature of the reaction was maintained at approximately 325° C. while the pressure was held at approximately 700 atmospheres. A 75% yield of propionic acid was obtained together with other aliphatic acids.

Example 2.—A gaseous mixture, containing 85% carbon monoxide, 5% each of methanol, water vapor, and hydrogen is passed together with approximately 1% ammonium chloride over activated charcoal which is disposed in a conversion chamber suitable for the carrying out of exothermic gaseous reactions. The reaction is conducted at a temperature of approximately 325° C. and a pressure of approximately 700 atmospheres. Upon condensation of the products of the reaction a good yield of acetic acid is obtained together with a small amount of other aliphatic acids.

Example 3.—A gaseous mixture containing 90 parts by volume of carbon monoxide, 18 parts by volume of steam, and 2 parts by volume of hydrogen iodide will react when passed over active carbon at a pressure of approximately 700 atmospheres and a temperature of 325° C. to give formic acid, upon condensation of the reaction products.

Example 4.—A gaseous mixture, containing 80% carbon monoxide, and 5% each of methanol, water vapor, and hydrogen, is passed together with approximately 5% hydrogen chloride over active carbon which is disposed in a conversion chamber suitable for the carrying out of exothermic gaseous reactions. The reaction is conducted at 325° C. and a pressure of 700 atmospheres. Acetic acid is obtained upon condensation of the reaction products.

It has been proposed to catalyze various organic vapor phase reactions by means of metallic halides or sulphates supported upon a porous material, such as silica gel, activated charcoal, etc. By conducting the reaction in accord with this invention, however, and employing with the gaseous reactants a volatile halide I have found that a higher average space-time-yield is obtainable over extended periods of operation without the presence of a metallic halide or sulfate present on the activated charcoal. The advantages to be derived from using activated charcoal per se over charcoal promoted with a metallic halide or sulfate are many. For example, it is not expensive to prepare; does not require frequent replacement; and is readily available.

From a consideration of the above disclosure, it will be realized that any process utilizing the above described two component catalyst will come within the scope of this invention without sacrificing any of the advantages that may be derived therefrom.

I claim:

1. In a vapor phase process involving the oxidation of organic compounds in which an oxide of carbon is one of the reacting constituents the step which comprises the employment of active carbon in the presence of a hydrogen halide as a catalyst for the reaction, the activity of the catalyst being maintained by passing the hydrogen halide over the active carbon throughout the reaction.

2. In a process for the synthesis of organic compounds in the vapor phase and in which carbon monoxide is one of the reacting constituents the step which comprises conducting the reaction in the presence of a hydrogen halide and active carbon.

3. In a process for the synthesis of organic compounds in the vapor phase and in which carbon monoxide is one of the reacting constituents the step which comprises conducting the reaction in the presence of active carbon and hydrogen chloride, the activity of the compound catalyst being maintained by passing the hydrogen halide over the active carbon throughout the reaction.

4. In a process for the synthesis of organic compounds in the vapor phase and in which carbon monoxide is one of the reacting constituents the step which comprises conducting the reaction in the presence of hydrogen chloride and active carbon, as the catalyst therefor.

5. In a process for the synthesis of organic compounds in the vapor phase in which carbon monoxide reacts with another compound the step which comprises conducting the reaction between carbon monoxide and the compound in the presence of active carbon containing an adsorbed volatile halide, different from the compound reacted, as the catalyst.

6. In a process for the synthesis of organic compounds in the vapor phase in which carbon monoxide reacts with an organic compound the step which comprises conducting the reaction between carbon monoxide and the organic compound in the presence of active carbon containing an adsorbed volatile halide, different from the compound reacted, as the catalyst, the activity of the catalyst being maintained by passing the volatile halide over the active carbon throughout the reaction.

7. In a vapor phase process involving the oxidation of organic compounds in which an oxide of carbon reacts with an organic compound the step which comprises conducting the reaction between carbon monoxide and the organic compound in the presence of a volatile halide, different from the compound reacted as a catalyst for the reaction, the activity of the catalyst being maintained by passing the volatile halide over the active carbon throughout the reaction.

8. In a process for the synthesis of organic compounds in the vapor phase in which carbon monoxide reacts with another compound the step which comprises conducting the reaction between carbon monoxide and the other compound with a volatile halide, which is not the compound being reacted with the carbon monoxide, and active carbon as a catalyst.

JOHN C. WOODHOUSE.